United States Patent [19]

Watkins

[11] Patent Number: 5,719,560

[45] Date of Patent: Feb. 17, 1998

[54] METHOD OF AUTOMATIC VERIFICATION OF PERSONAL IDENTITY

[76] Inventor: Christopher John Cornish Hellaby Watkins, 149 Clapham Road, London, England, SW9 0HP

[21] Appl. No.: 565,133

[22] Filed: Nov. 30, 1995

Related U.S. Application Data

[63] Continuation of Ser. No. 867,230, filed as PCT/GB90/01908, Dec. 7, 1990, abandoned.

[30] Foreign Application Priority Data

Dec. 8, 1989 [GB] United Kingdom ............... 8927855

[51] Int. Cl.$^6$ .................................... H04Q 1/00
[52] U.S. Cl. ................ 340/825.34; 340/825.3; 235/382.5
[58] Field of Search .................. 340/825.3, 825.31, 340/825.34; 235/382, 382.5

[56] References Cited

U.S. PATENT DOCUMENTS

| | | | |
|---|---|---|---|
| 4,184,148 | 1/1980 | Smagala-Romanoff | 340/825.34 |
| 4,193,061 | 3/1980 | Zoltai | 340/825.34 |
| 4,198,619 | 4/1980 | Atalla | 340/825.34 |
| 4,349,695 | 9/1982 | Morgan | 340/825.34 |
| 4,870,411 | 9/1989 | Lewiner et al. | 340/825.34 |
| 5,280,518 | 1/1994 | Danler | 340/825.31 |
| 5,323,146 | 6/1994 | Glaschick | 340/825.34 |

OTHER PUBLICATIONS

"Computers and Privacy: A Survey" Lance Hoffman Computing Surveys, vol. 1 No. 2 Jun. 1969.

*Primary Examiner*—Brian Zimmerman
*Attorney, Agent, or Firm*—Price, Gess & Ubell

[57] ABSTRACT

A method of automatic verification of personal identity is provided. The method includes the automatic generation of cue-response pairs and the allocation of such cue-response pairs to authorized people. Verification of the identity of an applicant as an authorized person is achieved by presenting the cues from one or more cue-response pairs previously allocated to the authorized person to an applicant and verifying replies entered by the applicant by comparing the replies with the responses in the cue-response pairs. A person can more easily remember cue-response associations than passwords. This knowledge may be tested by presenting any of the cues to an applicant and asking for the corresponding response. In this manner, the present invention enhances the level of security of methods of automatic verification of personal identity.

15 Claims, 3 Drawing Sheets

METHOD OF AUTOMATIC VERIFICATION OF PERSONAL IDENTITY

This is a continuation application of application Ser. No. 07/867,230, filed as PCT/GB90/01908, Dec. 7, 1990, now abandoned, for a METHOD OF AUTOMATIC VERIFICATION OF PERSONAL IDENTITY.

BACKGROUND OF THE INVENTION

1. Field of the Invention

The present invention relates to a method of machine verification of personal identity.

2. Description of the Related Art

In many endeavours it is necessary for people to be able to give evidence of their identity to a machine in a pre-arranged manner so that the machine can identify them. For example, a machine may regulate people's access to money, Information, goods, a physical location, control of equipment, or computational resources. Access to buildings or safes, for instance, is often controlled by locks. Automatic cash-dispensing machines control people's access to money in bank-accounts. Multi-user computer systems control people's access to information and computational facilities. In all these applications a machine must, actively or passively, be able to identify those people previously authorized to have access, and it must be able to distinguish authorized users from unauthorized interlopers.

The machine may identify each authorized person as a particular individual, or it may identify only that a person is a member of a particular group of authorized people. One person may have several different types of authorisation which are verified in different ways by the same machine. Several people may have the same type of authorization verified in the same way; in this case the machine identifies people in the sense of identifying them as members of a particular group.

A person who attempts to provide evidence of identity, whether falsely or not, will hereafter be referred to as an 'applicant'. An authorized person who has made arrangements to give evidence of identity in a certain manner will hereafter be referred to as a 'user'. An applicant who attempts to impersonate a user, or a person who attempts to discover how to impersonate a user will hereafter be referred to as an 'interloper'. 'Recognition method' will hereafter refer to a method of machine verification of identity or authorization.

There are three categories of recognition method which can be differentiated by the type of evidence of identity used. Recognition may be by means of some characteristic physical feature of users, or by means of some distinctive object in each user's possession, or by means of particular information that each user keeps confidential.

A number of physical features have been used or suggested for use in machine recognition: for example voice, hand-geometry, fingerprints, or even the pattern of blood vessels on the retina. However, recognition by means of distinctive physical features has two serious drawbacks. The first is that the necessary apparatus must be dedicated to the task of recognition, and this apparatus is usually expensive. The second drawback is much more serious. The physical characteristics of a person are constant and cannot be changed at will. If an interloper should succeed in counterfeiting the necessary physical characteristics of a user so that the interloper is identified as the user by the machine, then there is no way of ending the breach of security other than by changing the recognition method. If any recognition method using physical characteristics were to become widely used, it is likely that interlopers would rapidly develop methods of counterfeiting users' characteristics. If a recognition method based on fingerprints became widely used, methods of constructing rubber fingers with counterfeit prints would soon become widely known. An actual or suspected breach of security would be serious because a user cannot change his fingerprints to thwart an actual or suspected interloper. To achieve a high level of security, therefore, it would be necessary to use another recognition method as well.

Machine recognition of a distinctive object in the user's possession, such as a key or a magnetic card, is a widely used method. It suffers, however, from the obvious disadvantage that the object may be stolen, found, borrowed, or counterfeited by an interloper. Mere temporary possession of an object is often not a sufficient proof of identity. This method, like the previous method, should be used in conjunction with another method if a high degree of security is required.

The third category of recognition method relies on users giving evidence of identity by demonstrating knowledge of some confidential distinguishing information.

Any such method consists of three parts: a means of generating such distinguishing information; a means of allocating such information to users so that it can be used as evidence of identity on subsequent occasions; and a means of machine verification of a user's knowledge of the said information in the course of machine verification of the user's identity.

The verification of an applicant's knowledge of information is carried out by means of an applicant entering information into the machine in a pre-arranged manner when the machine is in the appropriate state to receive it. Once the machine has received the information it may be checked automatically. Information may be entered into a machine by setting dials (as in a combination lock), pressing keys on a keyboard, moving a pointing device, speaking into a microphone, or by other methods.

It may be necessary for an applicant to enter several different items of information into the machine. In that case it is useful for the machine to indicate to the applicant what type of information it is ready to receive next. In identifying an applicant, therefore, the machine repeatedly displays an indication of its state and then receives information entered by the applicant, until finally enough information has been received for the machine to decide whether the identification attempt should succeed or fail. The sequence of state-indications and entries of information may vary according to the information entered, and it may admit of a number of alternatives, and may also be varied from occasion to occasion.

A sequence of state-indications and entries of information that results in the machine identifying an applicant as a bona fide user will hereafter be termed a 'protocol'.

In other words, the machine identifies an applicant as a user only if a protocol is successfully followed.

There are at least three previously known information based recognition methods: the 'password' method; the 'private function' method; and the 'personal question' method.

In the password method, the confidential information on which recognition depends is a password, which is usually a sequence of alphanumeric characters.

The simplest form of password method is one in which a single password alone can be used to gain access to a facility.

An example of such a system is a bicycle combination lock: knowledge of the combination alone enables a person to open the lock. Authorized users of the facility are told or shown the password, and they are instructed to keep it confidential. All users use the same password. To gain access, a user simply enters the password when the machine is in a state of waiting for a user to identify himself.

A more complex type of password system can enable a machine to identify and to distinguish between a number of different users or types of user. Each user or type of user has their own password which is kept confidential not only from non-users but also from other users.

If no two users have the same password then it is possible to arrange for the machine to identify any user simply by the password entered. However, this arrangement has the disadvantage that that if there are many users the chance that an interloper's guess could correspond to the password of some user could become unacceptably high.

A better and widely used system is for users to identify themselves to the machine in two stages: the making of an 'identity claim' (a claim to be a particular user); and the entering of a password. The machine accepts an applicant's claim to be a particular user if the applicant enters the password allocated to that user. In this system, users' passwords are not in general the same, but they are not necessarily all different.

In the case of automatic cash-dispensing machines an applicant makes an identity claim by inserting a card; the applicant must then confirm the claim by entering the personal identification number (PIN) of the authorized user of the card. In the case of multi-user computer systems an applicant makes an identity claim by entering a 'user-identifier', which is usually a shortened form of a user's name. User-identifiers are not usually highly confidential. To confirm the claim the applicant must then enter the user's password.

A password system is secure if all users keep their passwords confidential, and if passwords are hard for interlopers to guess. The surest way for a user to keep his password confidential is to memorize it, not to write it down, not to communicate it to anyone, and to avoid having other people observe the entry of the password. In addition, passwords should be changed frequently so that any breach of security is of limited duration.

But password systems are not in general secure. The main reason for this is that people find passwords hard to memorize and to recall. This difficulty causes a variety of problems.

Passwords are either automatically generated, or else each user secretly chooses his or her own password. Automatically generated passwords may be random numbers, or they may be randomly constructed nonsense words such as PEGWIZ or SUDBAT, which are marginally easier to remember.

Automatically generated passwords are chosen in an arbitrary manner from a large number of possible alternatives, so they are certainly hard for interlopers to guess. But users find them difficult to remember, so they usually write them down.

Conversely, if users secretly choose their passwords they will often choose passwords that are easy for them to remember, but which are also easy for interlopers to guess. Users will often choose passwords that have some personal significance, and their colleagues may find such passwords easy to guess.

Moreover, the more frequently passwords are changed the more difficult they are to recall. A user may find it difficult to recall his current password because the memory of it is confused with memories of many previous passwords. This memory confusion has a simple cause: a user must recall the new password under almost exactly the same conditions under which he had to recall the old passwords. In the password method the machine prompts the user for the password in a standard manner: "Enter Password:" for example, and this prompt does not change when the password is changed.

Another reason why users find passwords difficult to remember is that they may need to remember a number of different passwords to identify themselves to different machines. Passwords for different machines may then become confused in users' minds.

If a user forgets his password then the machine is unable to identify him. The user must then contact an administrator of the machine who is authorized to issue users with new passwords. The procedure for assigning a new password to a user who has forgotten his old one is a potential security risk because the user must use some other method of identifying himself to the administrator. An interloper, therefore, could impersonate a user and obtain a new password by this route. In addition, the inconvenience that results when users forget their passwords is an incentive for them to write their passwords down.

A further source of insecurity is that an interloper can discover a user's password simply by observing the user entering the password during the identification protocol. With a computer system, users enter their passwords on the exposed keyboard of a computer terminal and an interloper only needs to watch the user's hands as the password is being entered.

It is a weakness of the password method that an interloper need only observe a user's identification protocol on one occasion to be able to impersonate the user successfully.

All the disadvantages of the password method that have been mentioned are dramatically alleviated by the present invention.

The 'private function' method has been suggested but seldom, if ever, used. In the protocol the user makes an identity claim in the same way as with the password method. Instead of a password each user is allocated a mathematical function, such as one defined by $f(x)=2x+5$. Instead of a prompt such as "Enter password: ", the user is prompted by the display of a number. The number displayed is in general different on different occasions. The user must then apply the function to the number (preferably using mental calculation), and then he must enter the result into the machine. If the number entered by the applicant is the actual result of applying the function to the number given as the prompt, then the machine accepts the applicant's identity claim.

The sole advantage of this method is that it is not possible to ascertain a user's private function by observing, in full, a small number of protocols, because there would be many possible functions that would yield the same results for the numbers presented. However, few people are happy to remember mathematical functions, and performing mental arithmetic is tiresome.

The 'personal question' method has been used. Each user is allocated a number of highly personal questions. When the questions are allocated the user provides answers to the questions. These answers are stored, usually in encrypted form, in the machine. Examples of possible questions are "What is your mother's birthday?" or "What is the name of your dog?". During the protocol, the machine displays one or more of the questions allocated to a user and the user enters answers to the questions. The answers given are automatically checked against the answers stored in the machine. If an applicant answers sufficient of the questions correctly the machine accepts the applicant's identity claim.

One advantage of this method is that users are unlikely to forget answers to such questions. On the other hand, acquaintances of the user may also know the answers, or they may be able to discover them. Another disadvantage is that people may find it annoying to be repeatedly asked personal questions to identify themselves to a machine.

SUBJECTS OF THE INVENTION

No previously suggested recognition method based on protocols is entirely satisfactory. The present invention provides a recognition method with which the distinguishing information is both automatically generated and easy for users to remember. With the invention it is difficult for interlopers to discover the distinguishing information by observing protocols. A further advantage is that the machine can still identify a user even if he has forgotten part of the distinguishing information. As a consequence, the present invention is inherently far more secure than the protocol methods suggested previously. In many applications, the present invention could replace recognition methods based on physical characteristics or distinctive objects.

SUMMARY OF THE INVENTION

The present invention provides a recognition method comprising a method of automatically generating distinguishing information, and of allocating the distinguishing information to users, and a method of subsequently identifying users by means of a protocol in which the user enters the distinguishing information into the machine. The distinguishing information is in the form of an association between a cue and a response: such an association will hereafter be referred to as a 'cue-response pair'. At least one automatically generated cue-response pair is allocated to each user. Subsequent identification of an applicant as a particular user is by means of a protocol, in the course of which the machine presents to the applicant the cues from one or more cue-response pairs allocated the the said user. The machine accepts from the applicant a reply for each cue presented. The machine identifies the applicant as the user if the applicant gives correct replies to a sufficient number of the cues presented, a correct reply to a cue being the response paired with the cue in a cue-response pair allocated to the user. The number of cues presented in the course of a protocol may be fixed or variable. The number of correct replies that the machine requires for the acceptance of an applicant's identity claim may be fixed, or it may be variable and it may depend on the number of incorrect replies given by the applicant in the course of the. protocol.

THEORETICAL DISCUSSION OF THE PREFERRED EMBODIMENTS

The main advantage of the present invention over the 'password method' is that human memory for associations between cue-response pairs, particularly imageable cue-response pairs, is durable and reliable. When the cue from a previously memorized cue-response pair is presented it acts as a powerful mnemonic aid for the recall of the response. Furthermore each authorized user can be allocated a number of different cue-response pairs which together constitute a large amount of distinguishing information. Even if a user cannot remember all cue-response pairs he has been allocated, he will almost certainly remember a sufficient number of them for him to be positively identified. There should, therefore, be little temptation for users to write down the cue-response pairs they have been allocated, and occasions on which the user forgets so many cue-response pairs that the machine cannot positively identify him should be rare. A further advantage is that each time a user is identified a different selection of his cue-response pairs may be presented, and in a different order. An interloper would therefore have to observe several protocols and would have to note a number of cue-response pairs to be sure of being able to impersonate a user.

Embodiments of the invention will now be described by way of example only.

One embodiment of the invention is as a multi-user computer system programmed so that an applicant's access to computational facilities and stored information is conditional on the computer system verifying the applicant's identity as one of the authorised users.

In one form of the invention the cues and the responses are words or phrases. A set of possible cues, referred to hereafter as the cue-set, and a set of possible responses, referred to hereafter as the response-set, are stored in the machine. A cue-response pair is generated by the automatic selection of a cue from the cue-set and a response from the response-set.

The cue-set and the response-set should be constructed in such a way that it is easy for a user to remember an association between any member of the cue-set and any member of the response-set. That is, any cue-response pair constructed by taking a cue from the cue-set and a response from the response-set should be easy for users to memorize.

Such associations are easy to memorize if the cue-set and the response-set are collections of imageable words or phrases. (The cue-set and the response-set may overlap.) It is well known in the field of cognitive psychology that associations between imageable words are easy to commit to memory and easy to recall. Many such associations may be committed to memory without confusion between them provided that the cues are all different.

An imageable word, phrase, or sentence is one that can be readily associated with a characteristic image. Examples of imageable words and phrases are: 'wolf', 'castle', 'brown sugar', 'clown', 'bolt of lightning', 'Statue of Liberty'. Examples of words and phrases that are not readily imageable are: 'notify', 'remote', 'errand', 'contrary', 'secular', 'moment', 'reason for belief'. Imageability is to a certain extent a subjective property, and it is also a matter of degree. Nevertheless it is possible to find many words and phrases that would be generally accepted as highly imageable. Methods of constructing sets of linguistic expressions that are generally judged to be highly imageable will now be described.

The linguistic expressions in the cue-set and the response-set should be ones that the intended users of the machine should generally find highly imageable. Whether users will find a given linguistic expression highly imageable depends upon the users' cultural backgrounds and on the languages or dialects that they speak. It is not possible, therefore, to give definitive lists of cues and responses that would be suitable for any group of users now and in the future. It is, however, possible to construct lists of linguistic expressions that will be readily imageable for a group of users by selecting expressions according to the following criteria.

First, for a user to find an expression imageable, the user must have a clear conception of its meaning. For example, the word 'sextant' would not be readily imageable to a person who did not know the word, or to a person who knew what a sextant was for but who did not know what one looked like. 'Sextant' would, however, be highly imageable for an English-speaking navigator.

Secondly, the following categories of words and phrases will be found to be imageable:

names and descriptions of well-known physical objects, such as 'car', 'table', 'fork', 'light-house', 'glass of beer';

words and phrases that describe people, animals, or plants, such as 'clown', 'baby', 'cat', 'giraffe', 'rose', 'soldier';

proper names of well known (possibly fictional) people or places, such as 'Sherlock Holmes', 'Venice', 'The Eiffel Tower';

names or descriptions of perceivable attributes, such as 'purple', 'sticky', 'crunchy';

names or descriptions of substances, such as 'tar', 'cheese', 'granite';

names or descriptions of physical processes or actions, such as 'run', 'running', 'grind', 'grilling meat', 'breaking glass';

names or descriptions of perceivable events, such as 'sunset', 'Cup Final', 'a soldier salutes', 'a foggy morning in autumn with leaves on the ground', 'the boy stood on the burning deck'.

These categories are not mutually exclusive. The majority of imageable terms are descriptions of physical entities, in the sense that they describe or refer to objects, people, animals, plants, or substances, and the entity may be further specified as being involved in some action, event, or process, as in the imageable expressions 'a soldier salutes', 'burning straw', 'spilt milk', 'the tiger springs'. Single words such as 'sea', 'moon', 'ship', 'dungeon' may also be termed descriptions of physical entities, whether the entity referred to is unique, as in 'sun', or general as in 'ship'.

A third criterion for imageability is that a word should not be too general in meaning. For example 'dwelling', 'furniture', 'cutlery', 'employee', and 'animal' are less readily imageable than 'bungalow', 'chair', 'knife', 'salesman', and 'rabbit' respectively. A general term may not be highly imageable if its referents cannot be distinguished according to some similarities of appearance.

The three criteria for imageability given above should be sufficient to ensure that an expression that satisfies the criteria should be found to be imageable by most intended users. However, if during the construction of a set of imageable expressions it is found that the criteria are difficult to apply with precision, then an additional method of selecting those words that are readily imageable for the intended users is as follows.

A random sample of the intended users of the machine, or a random sample of people of similar educational and cultural background to the intended users, should be selected. The people selected should also speak the same dialects of the same languages as the intended users. A collection of well-known words in the dialects spoken by the intended users should be selected according to the three criteria given above, and the sample of people should be asked to Judge how imageable each word in the collection is.

Judgements of the degree of imageability of the words and expressions may be elicited in the following way. Each person should be given a list of the expressions, and should be asked to give a judgement as to how easy it is to form a picture of the meaning of the expression. The judgements could be expressed on a scale from 1 to 5, with 1 meaning difficult to picture and 5 meaning easy to picture. The judgements of the people selected should then be analysed using techniques that are well known in psychology, and those expressions that the selected people generally agreed were imageable may then be regarded as being imageable.

If the intended users of the machine are linguistically and culturally heterogeneous, then it may be necessary to compile various collections of imageable terms for different subgroups of intended users.

The cue-set and the response-set may then be constructed in the following way. Both sets should be collections of imageable expressions.

Cues should be unambiguous and specific. For example, although 'marble' is highly imageable, it is not very suitable for use as a cue because it is ambiguous in the sense that it can refer either to a type of stone or to a small glass ball. This ambiguity could lead to difficulty in recalling a response associated with 'marble' because the user might memorize the association when thinking of the type of stone, and subsequently when 'marble' was presented alone as a cue the user might interpret it in the other sense and try in vain to recall a response associated with an image of a small glass ball.

Some examples of expressions suitable for use as cues are: 'armchair', 'pine-tree', 'mackerel', 'snow on a mountain top'.

Suitable responses may be chosen as follows. Responses should be imageable. They should be short, so that they can be entered into the machine quickly. They should be easy to spell ('giraffe' would not be a good response). They should be common terms, so that they can easily be recalled. Ambiguity does not matter. There should not be other, equally common short terms that are similar in meaning, because if a common synonym of a response exists, it may be substituted for the original response on recall. For example, 'road', 'lane', and 'street' are too similar in meaning for any of them to be suitable for inclusion in a response-set. 'Carrot', however, is a word without a close synonym, and it is very suitable for use as a response.

Some examples of terms suitable for use as responses are: 'egg', 'cup', 'pen', 'rat', 'eye', 'woman', 'chair', 'water', 'moon', 'fish', 'rose', 'fork'.

It is possible to form a collection of more than 1000 words suitable for use as responses by users who are native speakers of English.

It is well known that people find it easy to remember an association between a cue and a response if the cue and the response are imageable expressions. Users should be instructed to commit the association to memory either by constructing a mental image in which the cue and the response interact, or else by making up a sentence that contains both the cue and the response and which connects them. An association between imageable words or expressions is memorable even if there is no conventional or plausible association between them.

For example, to memorize an association between 'wolf' and 'crown', a person might imagine a wolf uearing a crown, or else the person might make up a sentence such as 'the wolf is wearing the crown'. The image or sentence by which the association is committed to memory may be mundane or bizarre. The sentence or mental image that a person uses to commit an association to memory does not itself have to be remembered: the act of constructing a mental image or of making up a sentence only serves to help commit the association to memory. This mnemonic phenomenon has been known since antiquity, and has been studied by psychologists.

An association is committed to memory in the sense that, if the cue is subsequently presented, then the response may be easily be recalled. For example, suppose a person has committed to memory an association between 'wolf' and 'crown'. If, subsequently, the the person is asked to recall the word associated with 'wolf', then the word 'crown' can be easily recalled, provided that associations between 'wolf' and other responses have not also been committed to memory in the same manner.

A cue-response pair, once generated, is allocated to a user by displaying the cue and the response to the user. This may be done, for example, by means of an automatically printed slip of paper delivered confidentially to the user, or by displaying the cue and the response on the terminal screen, on the user's demand.

An alternative method of automatically generating and allocating cue-response pairs is as follows. A response-set is held in the machine, as before, but a cue-set is not held. When a cue-response pair is to be generated for a user, the user makes up a cue and enters it into the machine, and the machine automatically selects a response from the response-set and presents it to the user.

It is preferable to provide a facility for the user to be able to signify whether he wishes to accept or reject the cue-response pair being allocated. If the user signifies that he accepts the cue-response pair, then a record of an association between the user, the cue, and the response, hereafter referred to as a user-cue-response record, is held by the machine.

Once a cue-response pair has been allocated to a user it becomes one of the user's 'current' cue-response pairs, a cue-response pair that is current for a user being one that has been allocated to the user and which may be used during subsequent verification of an applicant's identity as the user.

To prevent each user's collection of current cue-response pairs from growing without limit as more cue-response pairs are allocated it is necessary for some of a user's current cue-response pairs to be periodically 'discarded'. Once a cue-response pair current for a user has been discarded it is not used subsequently to verify the identity of that user except in the unlikely event that the same cue-response pair is allocated again to the same user.

Various arrangements are possible for regulating the allocation and discard of cue-response pairs.

The allocation of cue-response pairs may be regulated automatically by the machine or it may be under the control of users. One possible form of automatic regulation would be for the machine to initiate the allocation of new cue-response pairs to users after fixed intervals of time, or else after a fixed number of verifications of a user's identity. Alternatively, or in addition, a facility may be provided for the user to request the allocation of a new cue-response pair.

Similarly the discard of cue-response pairs may be controlled by the user or by the machine. A facility may be provided for the user to view all the cues of his current cue-response pairs, and then for him to instruct the machine to discard certain of the pairs. Alternatively, it may be arranged for the machine to discard a cue-response pair after a fixed interval of time, or after it has been used a certain number of times.

If the allocation or discard of cue-response pairs is at the user's discretion then it may be necessary for the machine to impose a lower, and possibly also an upper limit on the number of cue-response pairs that may be current for a user.

It is important that no two cue-response pairs current for a user should have the same cue. To maintain the mnemonic effect of cues, it is also preferable that an interval of time should elapse between the discard of a cue-response pair and the allocation of another cue-response pair with the same cue.

An applicant's identity is verified by means of an information exchange protocol. As with the password system the machine indicates that the applicant may make an identity claim. The applicant then claims to be a particular user by entering that user's user-identifier, or by inserting a magnetic card, or by other means.

The machine then selects one or more cue-response pairs that are current for the named user, and the machine then verifies the applicant's knowledge of these cue-response pairs. The machine verifies the applicant's knowledge of a cue-response pair by displaying the cue to the applicant, then accepting a reply from the applicant, and then automatically comparing the reply with the response An the cue-response pair.

For example, if a current cue-response pair for the user is 'daffodil-fish', then the machine may select this pair and would then display an indication such as 'Enter the response for daffodil: ', or simply 'daffodil'. This is an indication that the applicant should then enter 'fish'.

An alternative form of indication is for the machine to display a message such as 'Press a key to see the cue and then enter the response'. The applicant should then press a key, upon which event the machine displays the cue. The machine may display the cue either for a period determined by the applicant (e.g. for as long as the applicant holds the key down), or for a fixed period (e.g. one second). This method of presenting the cue on demand has the advantage that it is then sore difficult for an interloper to see both the cue displayed and the reply entered during a protocol. If each user has several current cue-response pairs then an interloper needs to know which cues are paired with which responses in order to impersonate a user. If cues are displayed only briefly and on demand during protocols then it is difficult for an interloper to acquire this knowledge by casual observation of a user identifying himself to the machine.

The cue may be displayed as a pictorial image. The machine verifies the applicant's reply to each cue presented during the protocol.

The simplest verification method is for the machine to determine whether the reply is identical to the response in the appropriate user-cue-response record. With this method, verification has only two possible outcomes: success, if the reply and response are identical; and failure otherwise.

A disadvantage of this simple verification method is that users are prone to reply with words that are related in meaning to the correct responses; users remember the imageable meaning of a response, and not necessarily the exact word used to convey that meaning. For example, if the correct response is 'stone' then a user might give the reply 'rock'; and 'trout' or 'fish' might be substituted for 'salmon'. Although such replies are not identical to the correct responses, they do provide some evidence that the applicant was exposed to the cue-response pair. By taking account of these partially correct replies, it is possible to identify users more reliably and with shorter protocols.

Partially correct replies may be assessed by providing a stored table of the probable replies that users may give for each response. For example, the probable replies for the response 'road' are 'street' 'lane', and 'road' itself. For each response, each reply is associated with numeric score. The stored information that is needed consists, therefore, of response-reply-score records, each of which associates a response, a possible reply, and the score. The number of possible replies is, of course, very large, and it is impractical and unnecessary to store scores for all possible replies to each response. It is only necessary to store explicit response-reply-score records for a small number of the most probable replies, and also to store a default score, for each response, which is the score given to replies other than the most probable replies for which records are kept.

The score for a reply is computed as follows. Let the correct response be S., and let the applicant enter a reply R. If a response-reply-score record is held for the response S and the reply R, then the score is that specified in the record. If no response-reply-score record is held for S and R, then the score is the default score for S.

Various criteria for choosing the numeric values of the scores are possible. All reasonable criteria have two properties. First, replies that are commonly substituted for a response should have high scores for that response, and replies that are rarely substituted for that response should have low scores for that response. Second, a reply that may commonly be substituted for many responses end, in particular, for response S, should have a lower score for response S than another reply, equally likely to be substituted for S, but which is rarely substituted for any response other than S.

In the course of an identification protocol, the machine may test the applicant's knowledge of more than one cue-response pair. After the applicant has made his identity claim, the machine may select a sequence of cue-response pairs current for the (claimed) user, and it may test the applicant's knowledge of each cue-response pair in turn, in the manner already described. As each cue-response pair is tested, the machine keeps a record of the number of cue-response pairs tested and the total score obtained so far. If the sample verification method is used, the machine keeps a count of the number of successful verifications, instead of the total score.

The machine accepts or rejects the applicant's identity claim according to whether the applicant's total score (or total number of correct replies) rises above an acceptance threshold or falls below a rejection threshold. The levels of the acceptance and rejection thresholds may vary as a function of the number of cue-response pairs tested so far. For example, the acceptance and rejection thresholds could be set so that, with the simple verification method, the machine would accept the applicant's identity claim only if both of the first two replies were correct, or three out of the first four replies were correct, or four out of the first six replies were correct, otherwise the identity claim would be rejected.

An alternative method of testing an applicant's knowledge of several cue-response pairs is to present several cues simultaneously. The applicant should then respond by entering the corresponding responses in the correct order.

A device to verify the identities of a group of users in the manner already described could be constructed using a computer with a keyboard and a display screen, programmed to perform the functions described above. The programming could readily be accomplished by those skilled in the art and familiar with current password systems.

The present invention may also be applied to a combination lock in which the insertion of a card causes the mechanical rotation of one or more dials so as to display one or more symbols constituting the cue. The user is then required to rotate the dial or dials to another symbol or symbols so as to indicate the correct response.

BRIEF DESCRIPTION OF THE DRAWINGS

An example of a method according to the invention will now be described with reference to the accompanying drawings, in which.

DETAILED DESCRIPTION OF THE PREFERRED EMBODIMENTS

Figure 1:
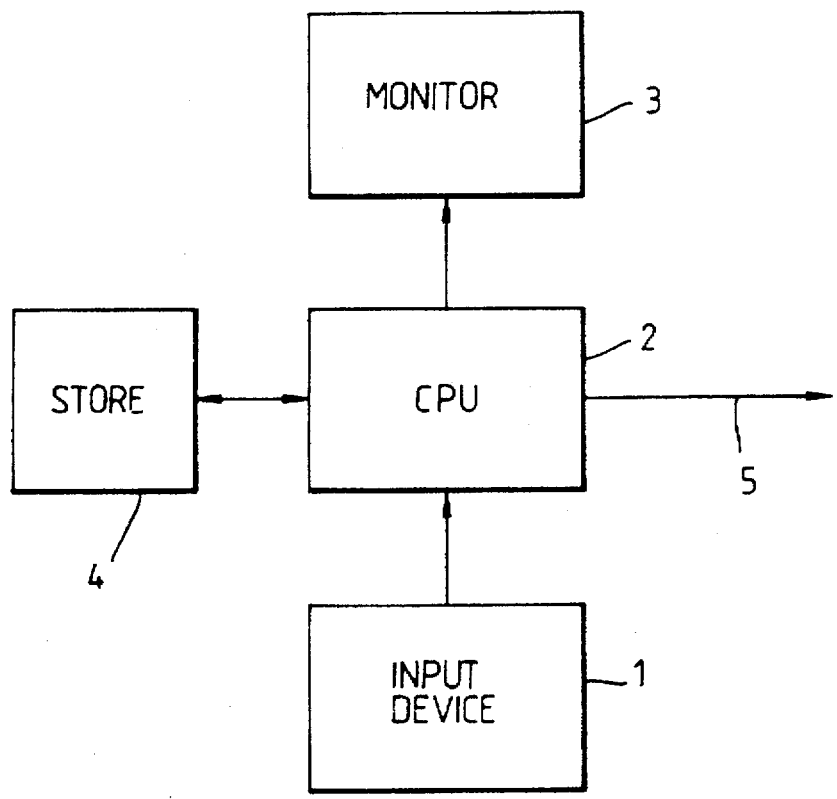
FIG. 1 is a block diagram of apparatus for carrying out the method.
Figure 2:
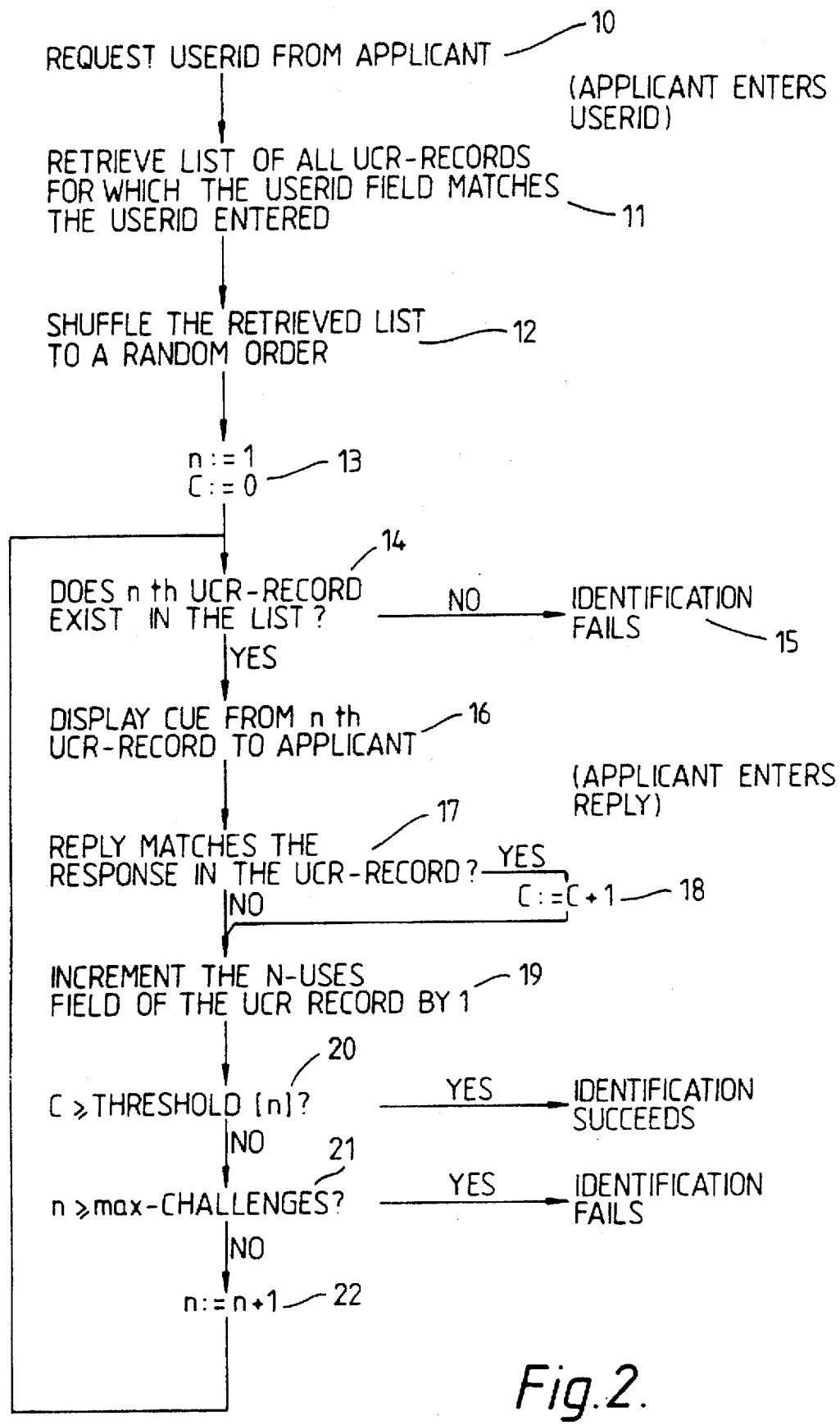
FIG. 2 is a flow diagram illustrating operation of the apparatus in FIG. 1, and, FIG. 3 is a flow diagram illustrating the generation and allocation of cue-response pairs.

The apparatus shown in FIG. 1 comprises an input device 1 such as a keyboard which is connected to a processor 2 which, in turn, is connected to a monitor 3. The processor 2 is connected to a store 4 which may be local to the processor or remote and connected thereto by a telephone line or the like. The processor 2 generates an output signal on a line 5 in accordance with whether or not a user of the input device has been verified.

The store 4 holds a set of user-cue-response records (ucr) for each valid user of the system. Each ucr record has four fields:

userid: the userid of the user cue: the cue response: the response n_uses: the number of times that this record has been used during identification protocols.

The processor 2 also has preset two parameters, namely max_challenges: the maximum number of cues that can be presented in the course of an identification protocol.

threshold[n]: threshold[n] is defined for n such that $1 \leq n \leq max\_challenges$. $0 \leq threshold[n] \leq n$. threshold[n] is the minimum number of correct replies required for identification to succeed after n cues have been presented.

Initially, the CPU 2 causes the monitor 3 to request a userid from an applicant (step 10, FIG. 1) and the applicant enters his userid via the input device 1. The processor 2 then retrieves from the store 4 all ucr records whose userid field matches the entered userid (step 11). The processor 2 then shuffles the retrieved list to random order (step 12) and sets variable n to 1 and variable c to 0 (step 13).

The processor 2 then enters a loop in which in the step 14 it determines whether the nth ucr record exists and if it does not the processor 2 indicates on the line 5 that the identification has failed (step 15). If the record does exist, the processor 2 then displays the cue corresponding to the nth record on the monitor (step 16). The applicant enters a reply to the cue via the input device 1 and the processor 2 compares the entered reply with the response in the ucr record (step 17). If the reply and response match the variable c is incremented by 1 (step 18). In addition, the n_uses field of the ucr record is incremented by 1 (step 19).

In a step 20 the current value of variable c is compared with the preset threshold [n] and if it is greater than or equal to that threshold the identification succeeds and a suitable signal is output on the line 5.

If c is less than the threshold [n] then the processor in a step 21 compares the current value n with the preset max_ challenges. If n is greater than or equal to max_challenges then the identification fails but otherwise n is incremented by 1 (step 22) and processing returns to step 14.

Figure 3:
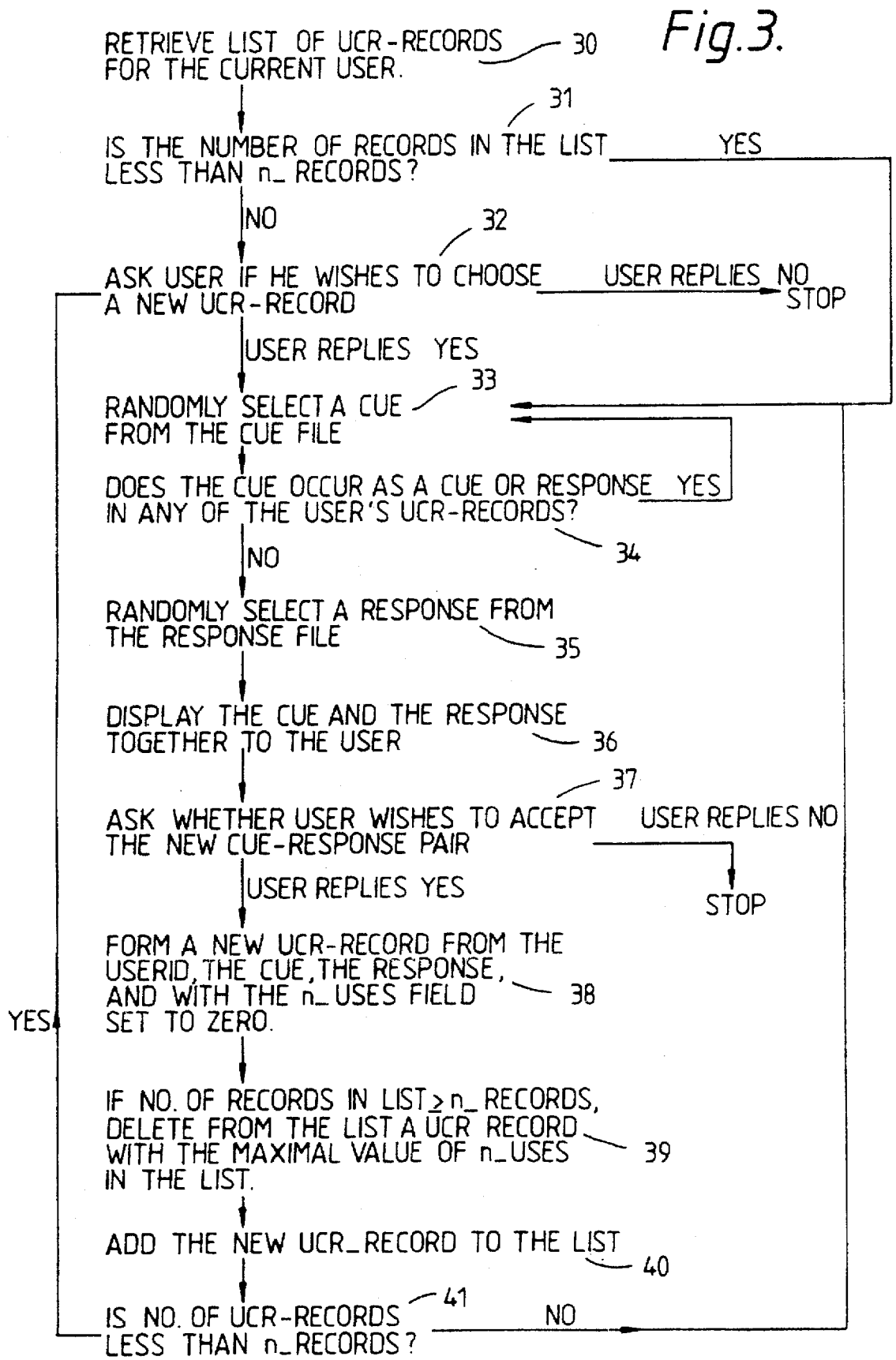

FIG. 3 illustrates the operation of the system when a new cue-response pair is to be set up. Initially, a parameter n_records is set up representing a number of ucr-records to be stored for each user.

When a user indicates that he wishes to add a new ucr_record to his list, he enters his userid and the processor 2 retrieves a list of ucr_records for the user from the store 4 (step 30). The processor 2 then checks to see whether the current number of records in the list is less than the parameter n_records (step 31) and if it is not asks the user if he wishes to choose a new ucr_record (step 32). If he does not, the process stops. If the user does wish to choose a new ucr_record or the number of records is less than n_records, the processor 2 randomly selects a cue from a cue file in the store 4 (step 33). The processor checks to see whether the cue already occurs as a cue or response in any of the users ucr_records (step 34) and if it does then selects a further cue. If it does not, the processor then randomly selects a response from the response file in the store 4 (step 35) and the selected cue and response are displayed on the monitor 3 (step 26).

The processor then requests the user to indicate whether or not he accepts the new cue-response pair (step 37) and if he does not, the process stops. If he does accept the cue-response pair, a new ucr_record is formed (step 38). If the number of ucr_records already in the list is greater than or equal to the parameter n_records then one of the ucr_records is deleted (step 39) and a new ucr_record added (step 40). If the number of ucr_records now stored is less than n_records processing returns to step 32 but otherwise processing stops (step 41).

I claim:

1. In a system for verifying an individual user's identity by machine, a system for generating cue and response expressions to be used for identifying a specific individual user, said system comprising:

storage means for storing a plurality of predetermined cue and response expressions;

selection means for automatically selecting a cue and a response expression from the storage means;

means for displaying the selected cue-response pair to the user; and means for recording the selected cue-response pair as assigned to said user for use in verifying said user's identity on subsequent occasions.

2. The system of claim 1 wherein said selection means randomly selects the cue expression and the response expression from different stored sets of predetermined expressions.

3. The system of claim 2 wherein said selection means selects the cue expression for a new cue-response pair that is different from the cue expressions in all other cue-response pairs currently allocated to that user at that time.

4. The system of claim 1 wherein said selection means automatically selects a response expression after a cue expression is entered by the user.

5. The system of claim 1, further comprising:

means for verifying the user's identity on subsequent occasions by presenting the cue expressions from the recorded cue-response pair assigned to the user, and comparing the response expression entered by the user with the response expression of the recorded cue-response pair.

6. The system of claim 5 wherein said verifying means presents a number of cue expressions to the user during verification of the user's identity dependent on the number of incorrect response expressions entered by the individual.

7. The system of claim 6 wherein said verifying means presents each cue expression only on the user's demand.

8. The system of claim 6 wherein said verify means presents each cue expression for a constant period of time.

9. The system of claim 6 wherein said verifying means presents each cue expression only during a period the user is pressing a key.

10. The system of claim 1 wherein the stored cue expressions consist of imageable words, phrases, or sentences.

11. The system of claim 1 wherein the stored cue expressions are descriptions of physical entities.

12. The system of claim 1 wherein the stored cue expressions are pictorial images.

13. The system of claim 1 or 10, wherein the stored response expressions consist of imageable words, phrases, or sentences.

14. The system of claim 11 or 12, wherein the stored response expressions are descriptions of physical entities.

15. The system of claim 1, wherein the stored response expressions are pictorial images.

* * * * *